(12) United States Patent
Chen

(10) Patent No.: US 7,024,962 B2
(45) Date of Patent: Apr. 11, 2006

(54) BICYCLE PEDAL ASSEMBLY HAVING A PEDAL BODY THAT IS FORMED WITH AN INTEGRAL FRONT CLEAT-RETAINING MEMBER

(76) Inventor: Chung-I Chen, No.3, Kung-Chi Rd., Yu-Ssi-Kung-Yeh Dist., Ta-Chia Chen, Taichung Hsien (TW)

( * ) Notice: Subject to any disclaimer, the term of this patent is extended or adjusted under 35 U.S.C. 154(b) by 467 days.

(21) Appl. No.: 10/615,707

(22) Filed: Jul. 9, 2003

(65) Prior Publication Data

US 2005/0005729 A1   Jan. 13, 2005

(51) Int. Cl.
*B62M 3/08* (2006.01)
(52) U.S. Cl. ........................................ 74/594.6; 36/131
(58) Field of Classification Search ............... 74/594.4, 74/594.6
See application file for complete search history.

(56) References Cited

U.S. PATENT DOCUMENTS

| | | | | |
|---|---|---|---|---|
| 5,203,229 A | * | 4/1993 | Chen | 74/594.6 |
| 5,381,708 A | * | 1/1995 | Liao | 74/594.6 |
| 5,497,680 A | * | 3/1996 | Nagano | 74/594.6 |
| 5,685,202 A | * | 11/1997 | Chen | 74/594.6 |
| 5,765,450 A | * | 6/1998 | Kruger et al. | 74/594.6 |
| 5,802,930 A | * | 9/1998 | Chen | 74/594.6 |
| 5,852,956 A | * | 12/1998 | Chen | 74/594.6 |
| 5,916,332 A | * | 6/1999 | Chen | 74/594.6 |
| 5,931,053 A | * | 8/1999 | Chen | 74/594.6 |
| 6,070,493 A | * | 6/2000 | Chen | 74/594.6 |
| 6,112,620 A | * | 9/2000 | Chen | 74/594.6 |
| 6,170,357 B1 | * | 1/2001 | Chen | 74/594.6 |
| 6,244,136 B1 | * | 6/2001 | Chen | 74/594.6 |
| 6,282,984 B1 | * | 9/2001 | Chen | 74/594.6 |
| 6,520,048 B1 | * | 2/2003 | Chen | 74/594.6 |
| 6,612,201 B1 | * | 9/2003 | Chen | 74/594.4 |
| 6,729,204 B1 | * | 5/2004 | Chen | 74/594.6 |
| 2002/0029654 A1 | * | 3/2002 | Campagnolo | 74/594.6 |
| 2002/0104403 A1 | * | 8/2002 | Chen | 74/594.6 |

* cited by examiner

*Primary Examiner*—Chong H. Kim
(74) *Attorney, Agent, or Firm*—Ladas & Parry LLP

(57) ABSTRACT

A bicycle pedal assembly includes a cleat, a front cleat-retaining member, and a rear cleat-retaining member. The front cleat-retaining member is formed integrally with a pedal body, is generally inverted U-shaped, and includes a thin middle portion and two thick side portions, among which a limiting groove is defined under the thin middle portion. The cleat has a front end engaging portion with a wide lower portion inserted into the groove and confined between inclined limiting surfaces of the thick side portions, and a narrow upper portion abutting against an arcuate concave limiting surface of the thin middle portion. Two arcuate convex connecting surfaces connect the inclined limiting surfaces to the arcuate concave limiting surface.

4 Claims, 15 Drawing Sheets

BICYCLE PEDAL ASSEMBLY HAVING A PEDAL BODY THAT IS FORMED WITH AN INTEGRAL FRONT CLEAT-RETAINING MEMBER

BACKGROUND OF THE INVENTION

1. Field of the Invention

This invention relates to a bicycle pedal assembly, and more particularly to a bicycle pedal assembly that includes a pedal body that is formed with an integral front cleat-retaining member.

2. Description of the Related Art

A pedal assembly for racing bicycles or mountaineering bicycles normally includes a cleat secured to a cyclist's shoe, a pedal shaft, a shaft tube sleeved rotatably on the pedal shaft, a pedal body, and two cleat-retaining mechanisms that are disposed on two opposite sides of the pedal body. Each of the cleat-retaining mechanisms consists of front and rear cleat-retaining members for retaining the cleat therebetween. However, the conventional pedal assembly has a drawback that it is difficult to remove the cleat from the pedal body.

SUMMARY OF THE INVENTION

It is the object of this invention to provide a bicycle pedal assembly that includes a cleat, which can be removed easily from a cleat-retaining mechanism.

According to this invention, a bicycle pedal assembly includes a pedal body, a cleat-retaining mechanism consisting of a front cleat-retaining member and a rear cleat-retaining member, a cleat retained between the front and rear cleat-retaining members, and a biasing member for biasing the rear cleat-retaining member to turn frontwardly so as to clamp the cleat between the rear cleat-retaining member and an assembly of the pedal body and the front cleat-retaining member. The front cleat-retaining member is formed integrally with the pedal body, is generally inverted U-shaped, and includes a thin middle portion and two thick side portions, among which a limiting groove is defined under the thin middle portion. The cleat has a front end engaging portion that is formed with a wide lower portion inserted into the groove in the front cleat-retaining member and confined between inclined limiting surfaces of the thick side portions, and a narrow upper portion abutting against an arcuate concave limiting surface of the thin middle portion of the front cleat-retaining member. The thin middle portion is formed with an arcuate concave limiting surface. Each of the thick side portions is formed with an inclined limiting surface. The front cleat-retaining member further includes two arcuate convex connecting surfaces that connect respectively the inclined limiting surfaces to the arcuate concave limiting surface. When the cleat is swung forcibly in a horizontal plane, a front end of the narrow upper portion of the front end engaging portion of the cleat moves over the arcuate concave limiting surface and one of the arcuate convex connecting surfaces of the front cleat-retaining member so as to turn the rear cleat-retaining member rearwardly until the cleat can be removed from the cleat-retaining mechanism. Due to the guiding action of the arcuate convex connecting surfaces, the cleat can be removed smoothly from the front cleat-retaining member.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
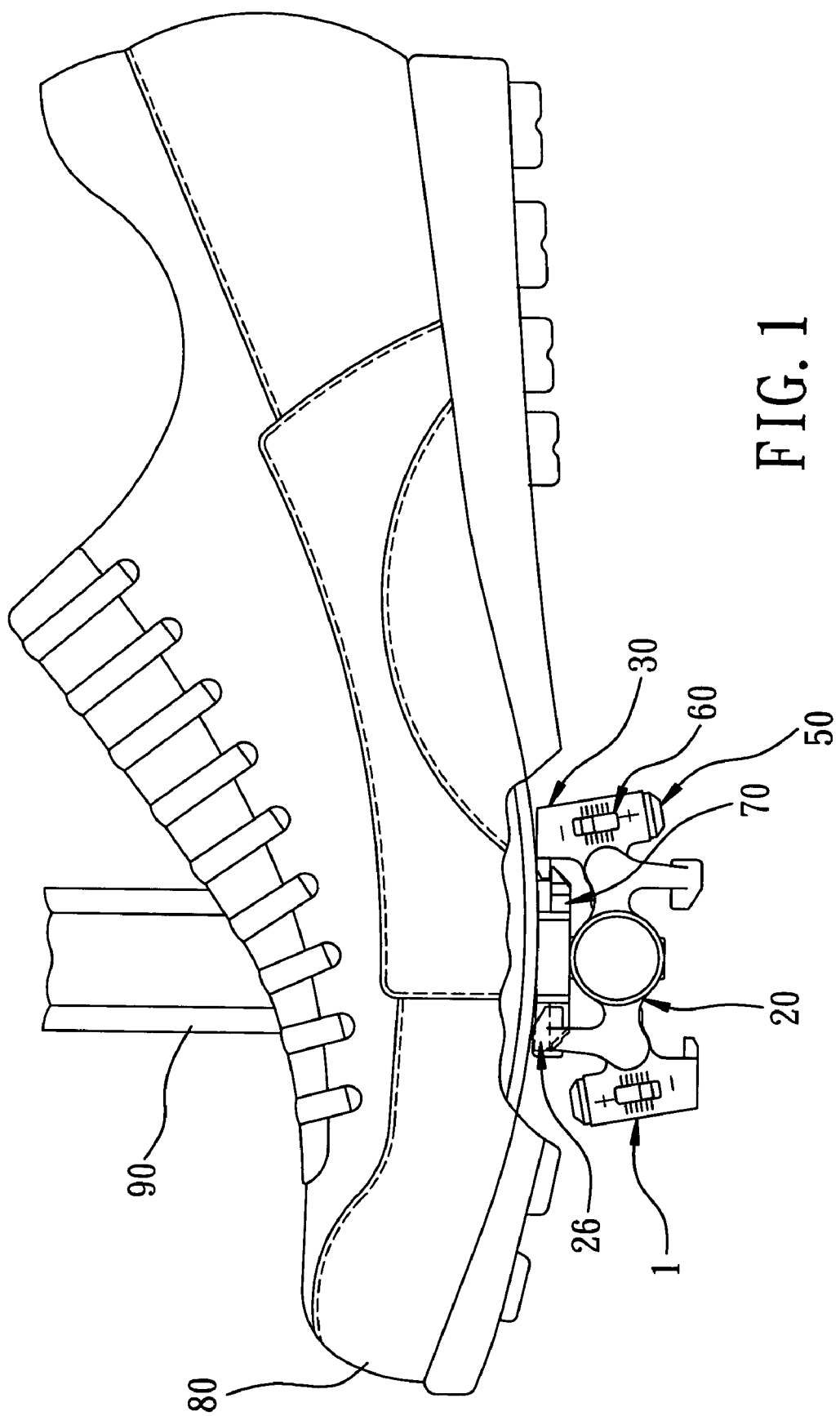
FIG. 1 is a schematic side view of the preferred embodiment of a bicycle pedal assembly according to this invention, which is attached to a cyclist's shoe.
Figure 2:
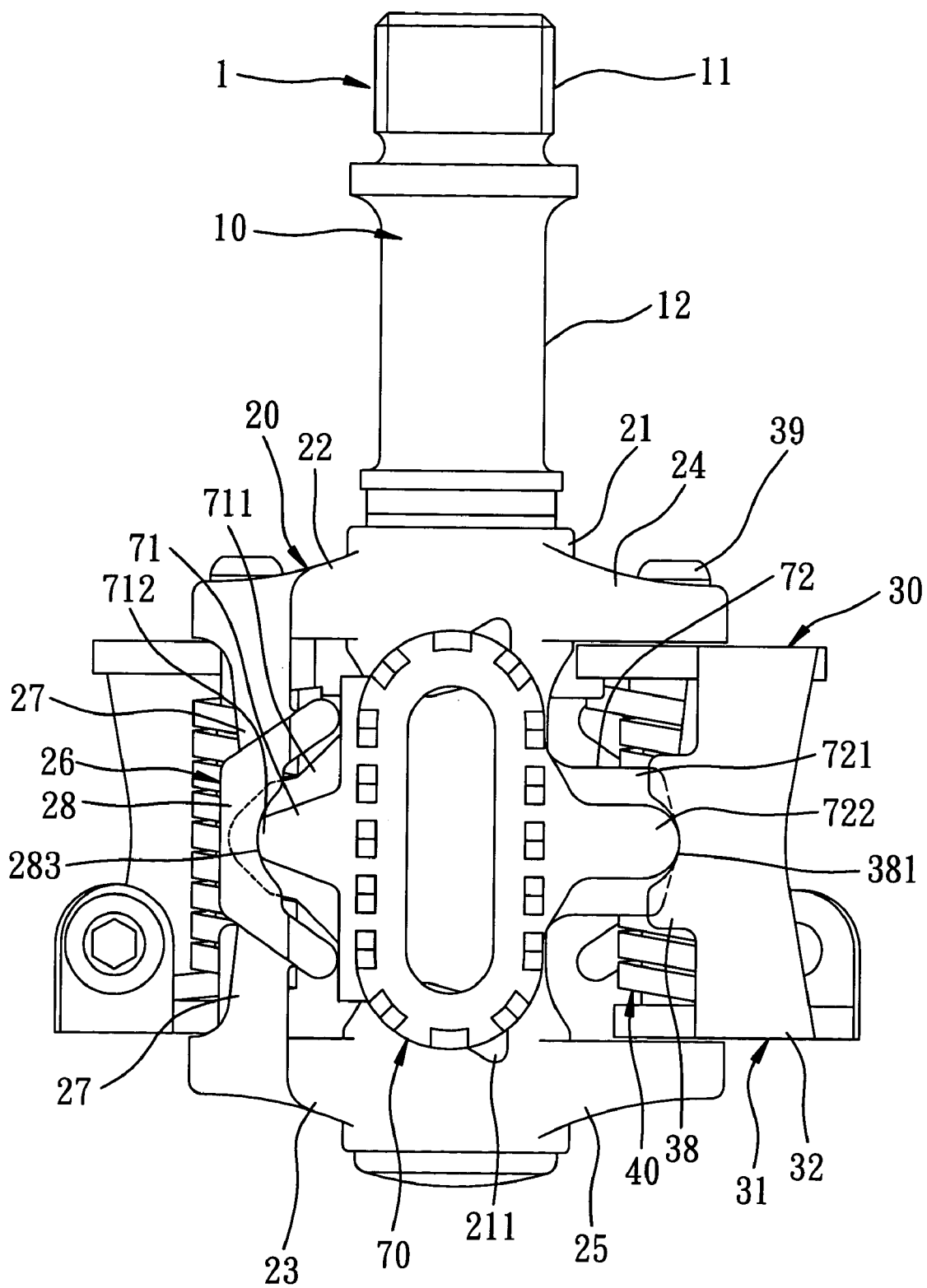
FIG. 2 is a top view of the preferred embodiment, illustrating how a cleat is retained between front and rear cleat-retaining members.

Referring to FIGS. 1, 2, 3, 4, and 5, the preferred embodiment of a bicycle pedal assembly 1 according to this invention is shown to include a pedal shaft 10, a pedal body 20, a cleat 70, and two cleat-retaining mechanisms disposed respectively on two opposite sides of the pedal body 20. When the bicycle pedal assembly 1 is in use, as shown in FIG. 1, the cleat-retaining mechanisms are disposed one above the other. Hereinafter, only the upper cleat-retaining mechanism will be described because the lower cleat-retaining mechanism does not engage the cyclist's shoe 80 during use.

Figure 5:
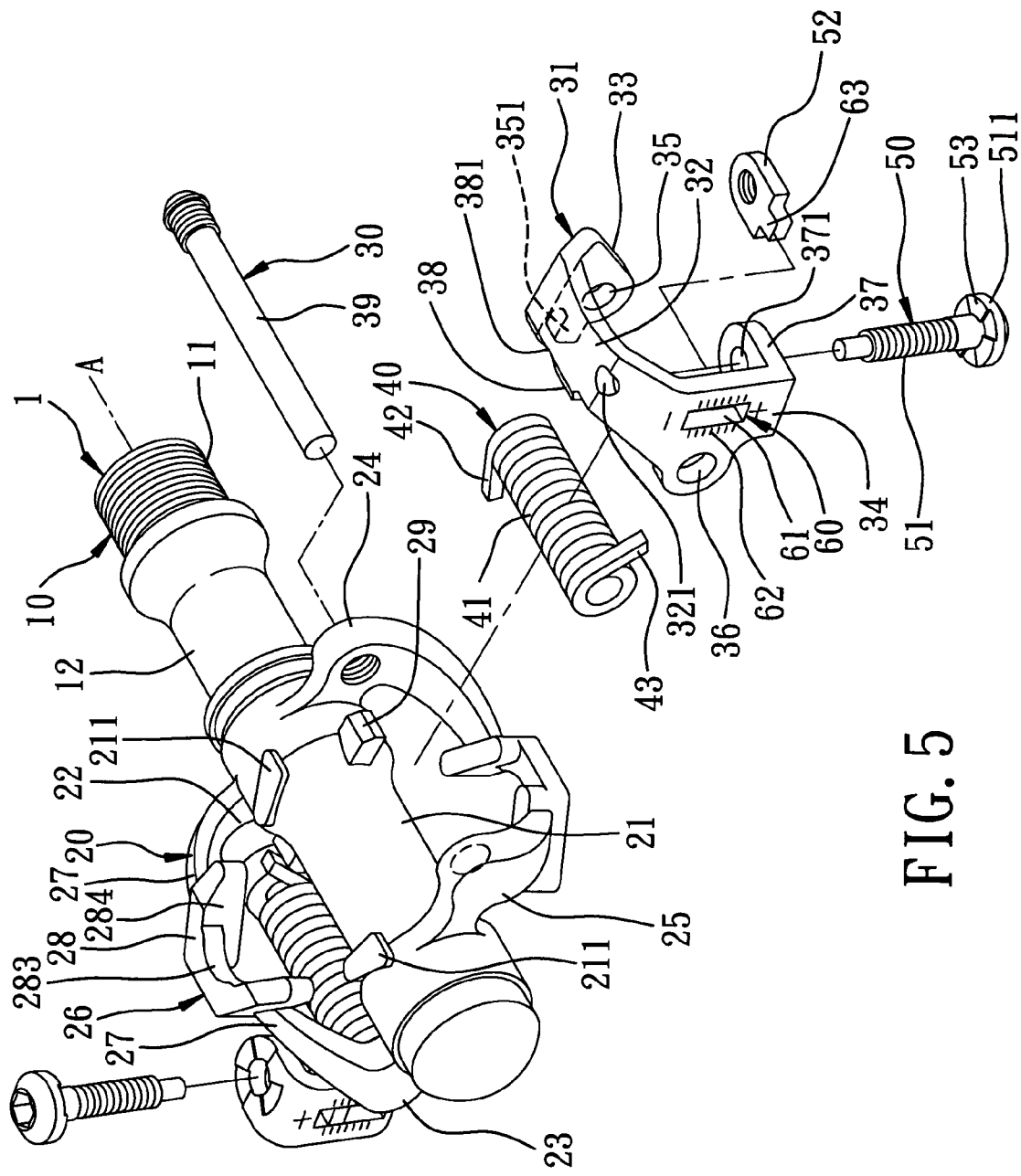
FIG. 5 is a fragmentary exploded perspective view of the preferred embodiment, in which the cleat is removed for the sake of brevity.
Figure 6:
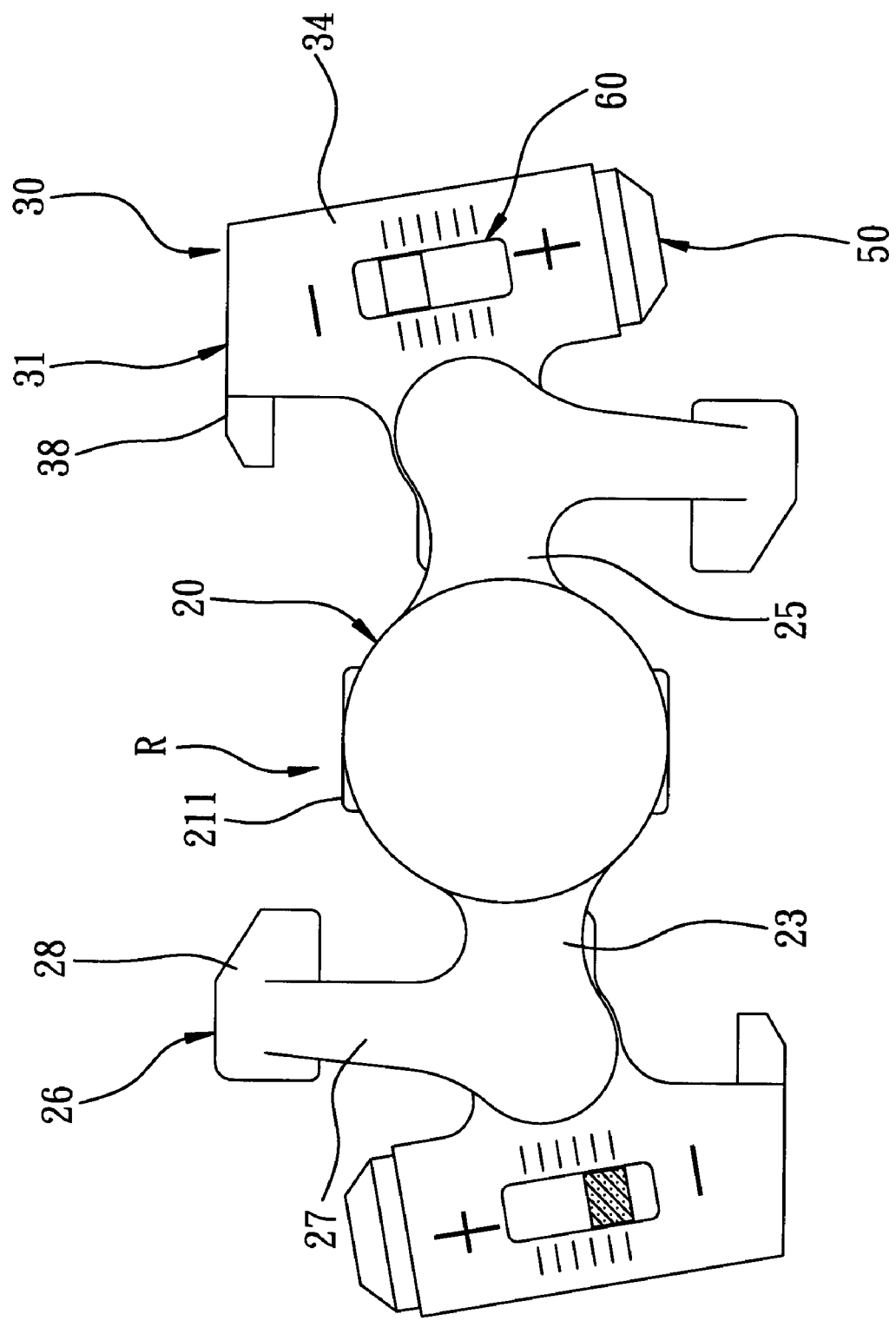
FIG. 6 is a fragmentary side view of the preferred embodiment.
Figure 7:
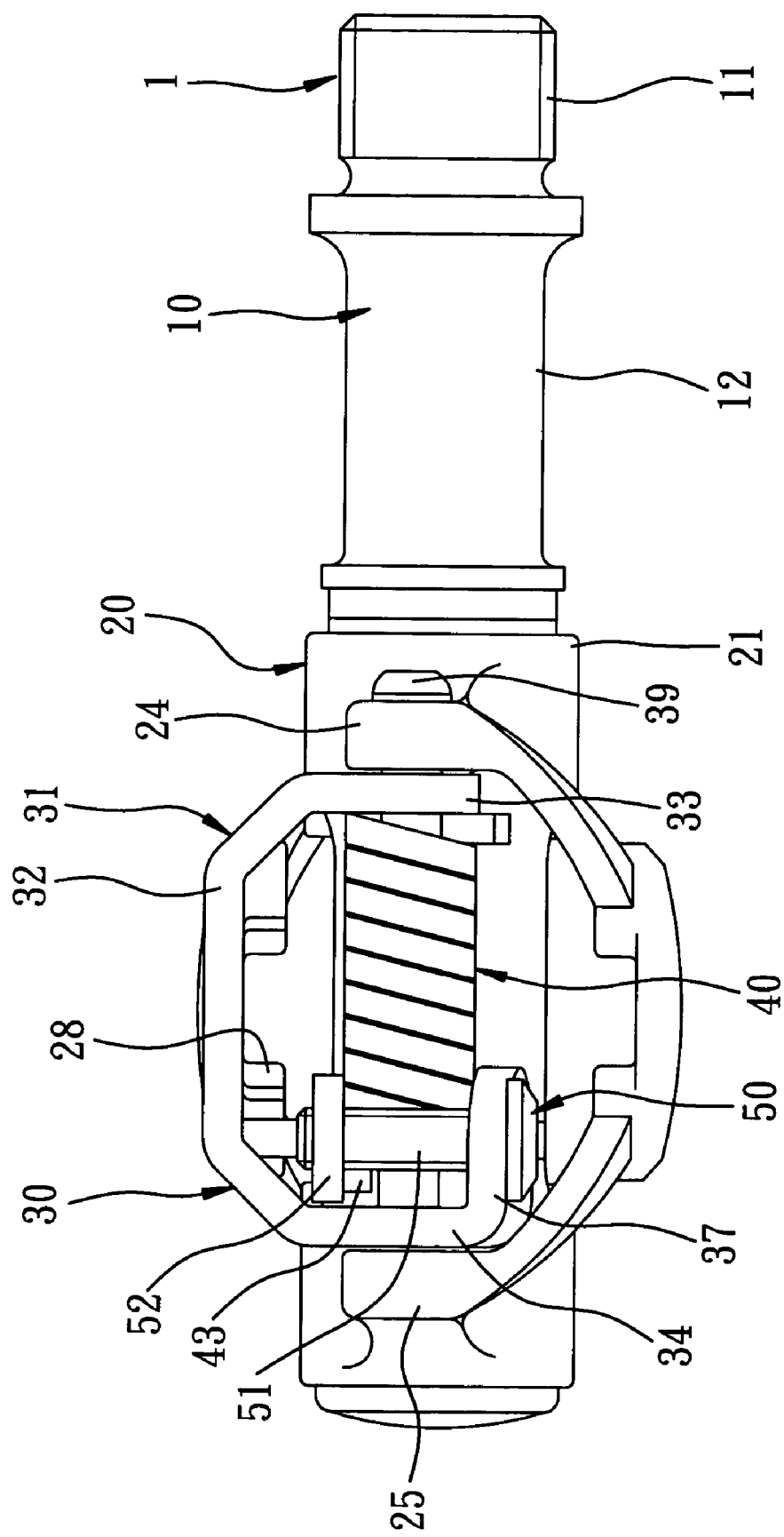
FIG. 7 is a fragmentary front view of the preferred embodiment.

The pedal shaft 10 is connected to a crank 90 (see FIG. 1) in a known manner, and has an inner end 11, an outer end 12, and a central axis (A) (see FIG. 5).

Figure 11:
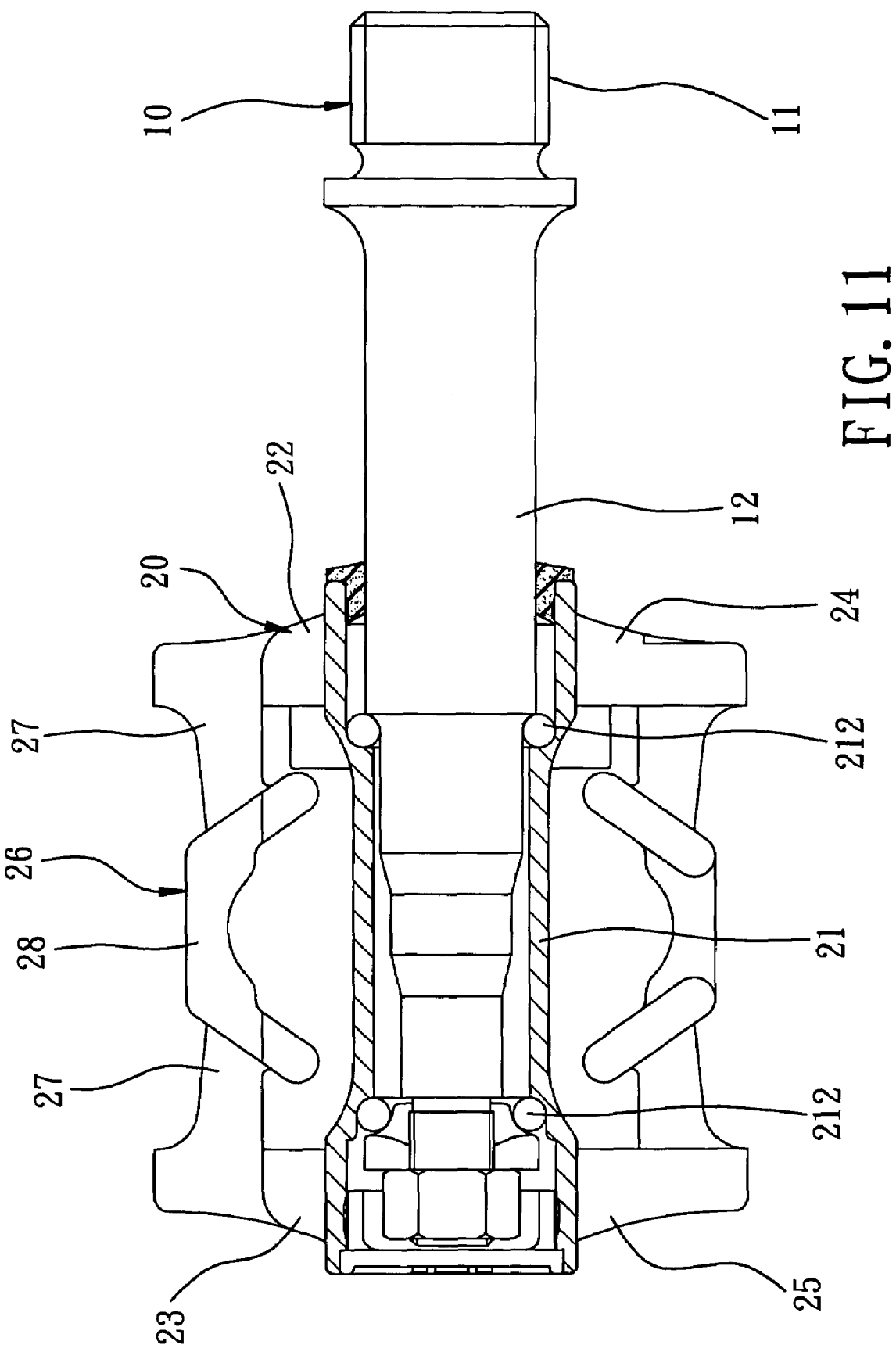
FIG. 11 is a sectional view of the pedal body of the preferred embodiment, illustrating how the pedal body is mounted to a pedal shaft.
Figure 12:
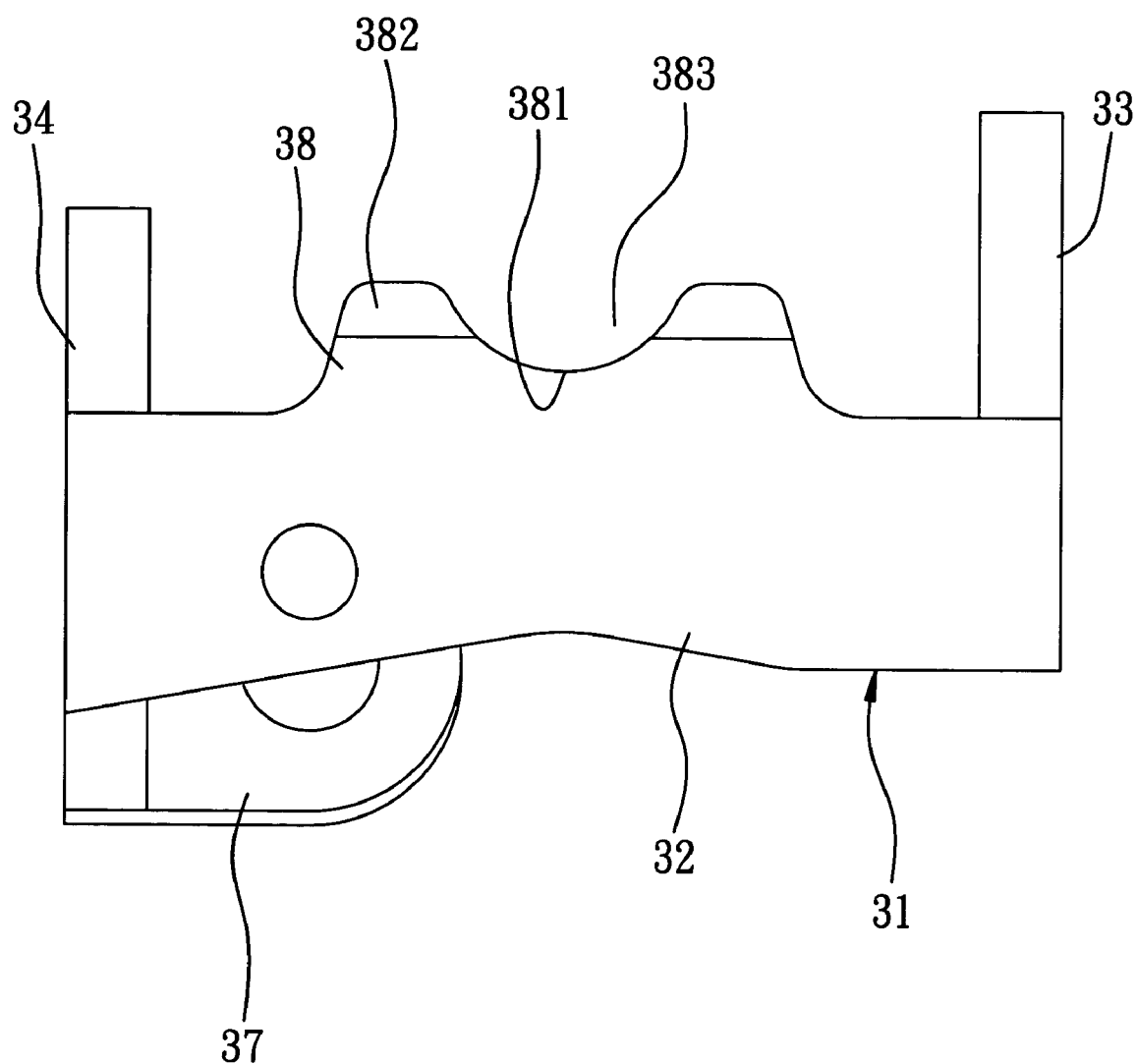
FIG. 12 is a top view of a rear cleat-retaining member of the preferred embodiment.
Figure 13:
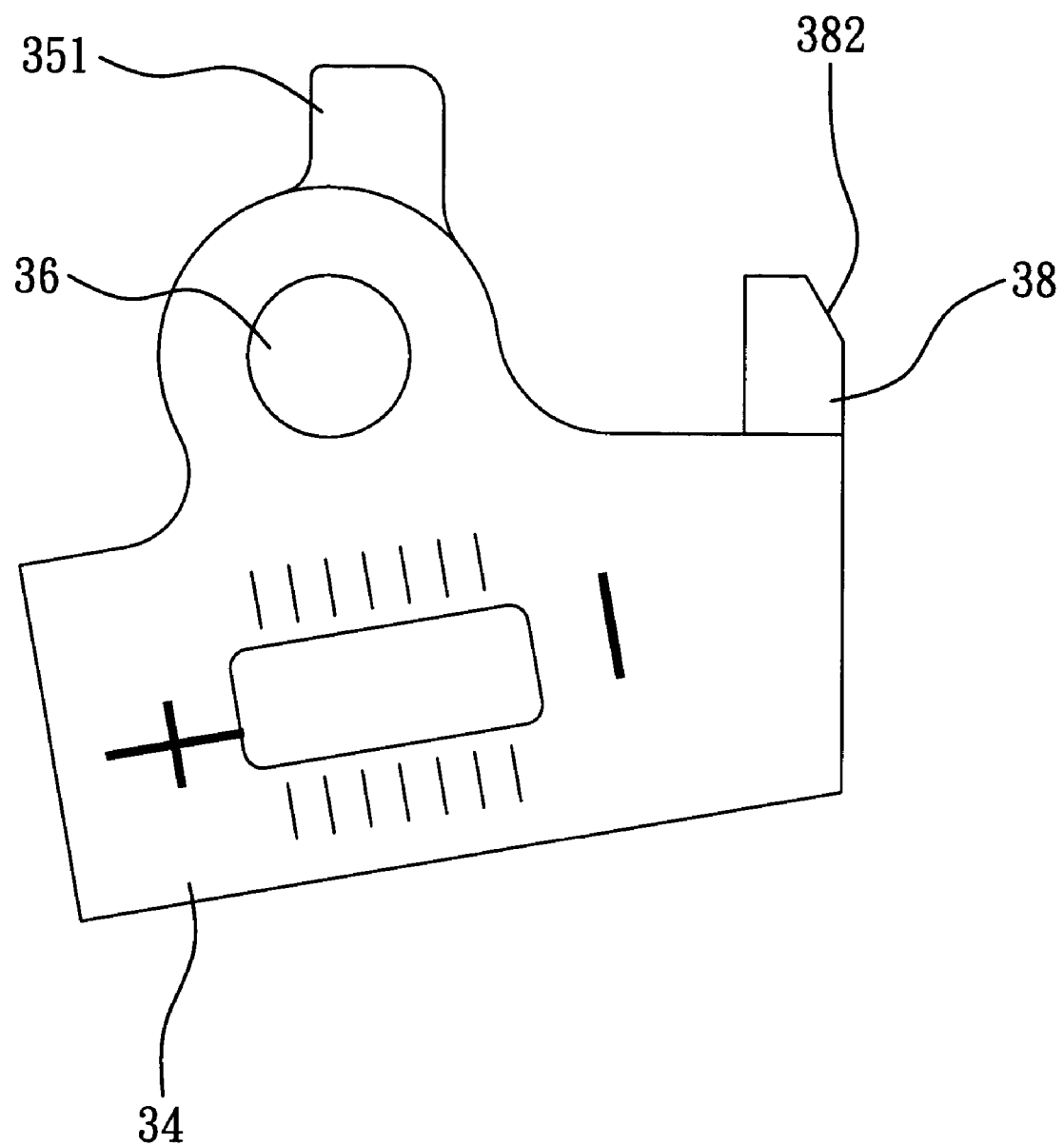
FIG. 13 is a left side view of the rear cleat-retaining member of the preferred embodiment.
Figure 14:
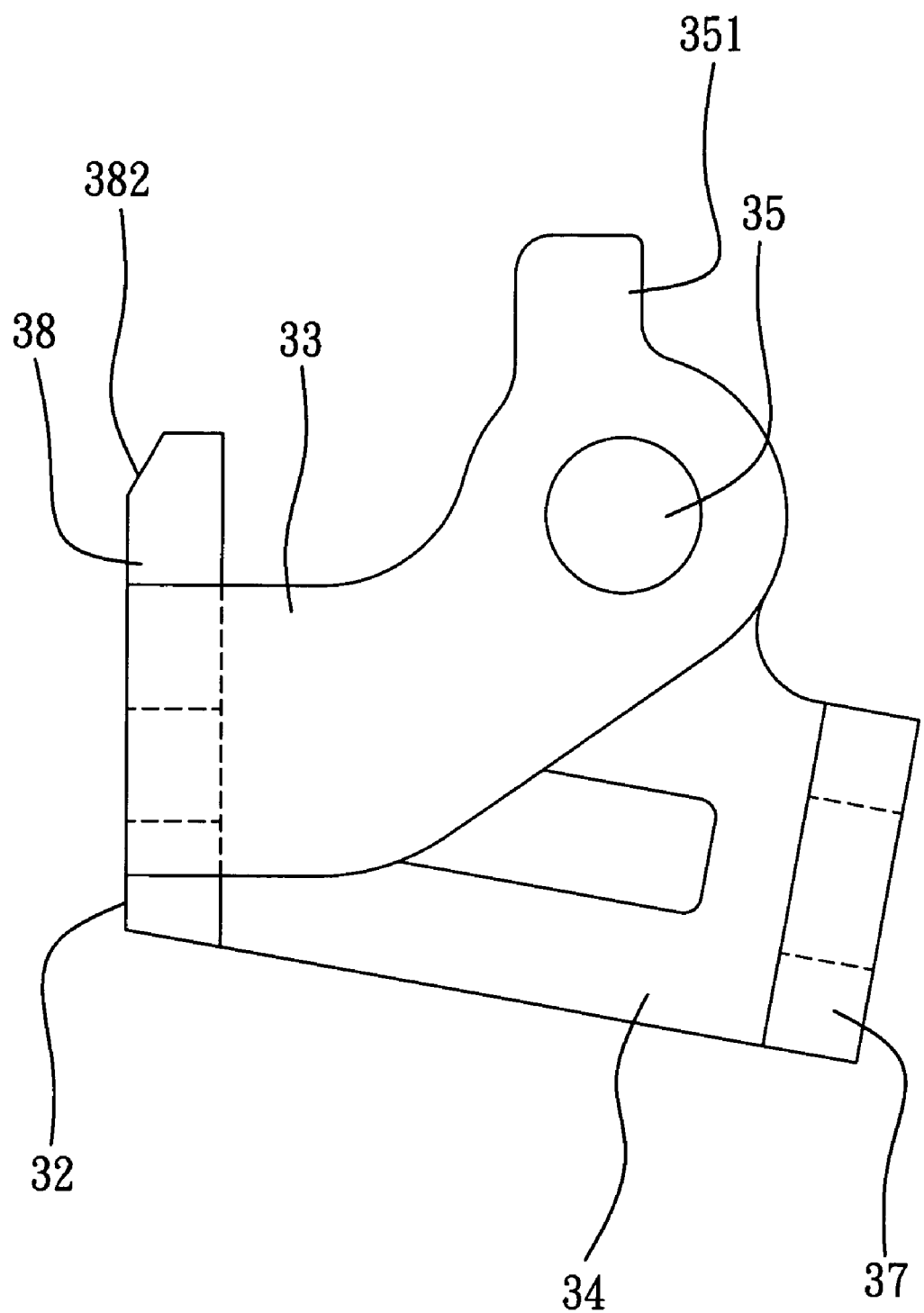
FIG. 14 is a right side view of the rear cleat-retaining member of the preferred embodiment.

The pedal body 20 is unitary, and includes a shaft tube 21 sleeved rotatably on the pedal shaft 10, which is rotatable about the axis (A), two aligned front pivot arms 22, 23 that extend frontwardly from the shaft tube 21, and two rear pivot arms 24, 25 that extend rearwardly from the shaft tube 21. The shaft tube 21 is formed integrally with two horizontal cleat-supporting plates 211 that are disposed proximate to the rear pivot arms 24, 25, respectively, and that support the cleat 70 thereon. A plurality of balls 212 (see FIG. 11) are disposed between the shaft tube 21 and the outer end 12 of the pedal shaft 10 so as to facilitate rotation of the pedal body 20 about the pedal shaft 10.

Figure 8:
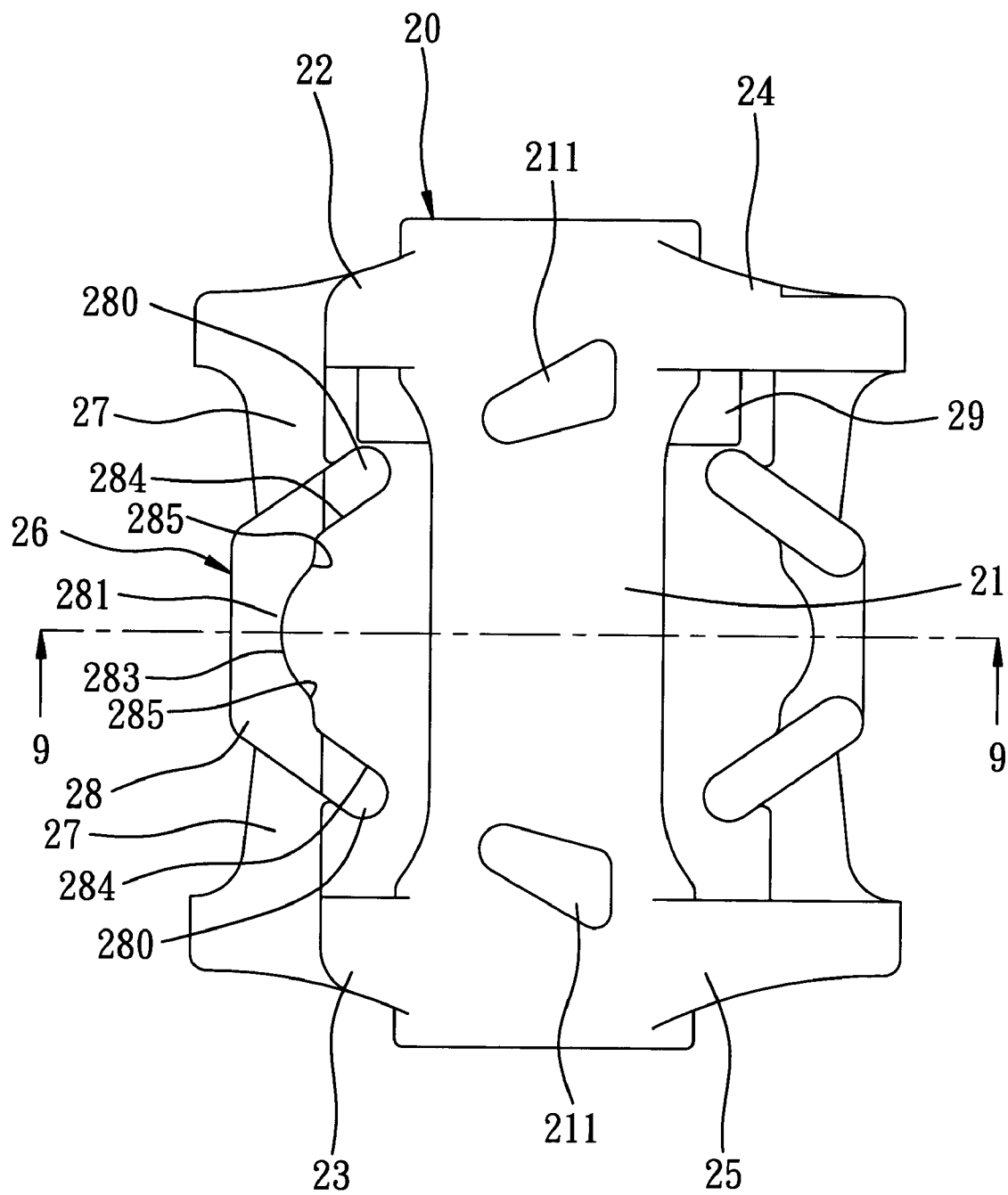
FIG. 8 is a top view of a pedal body of the preferred embodiment.
Figure 9:
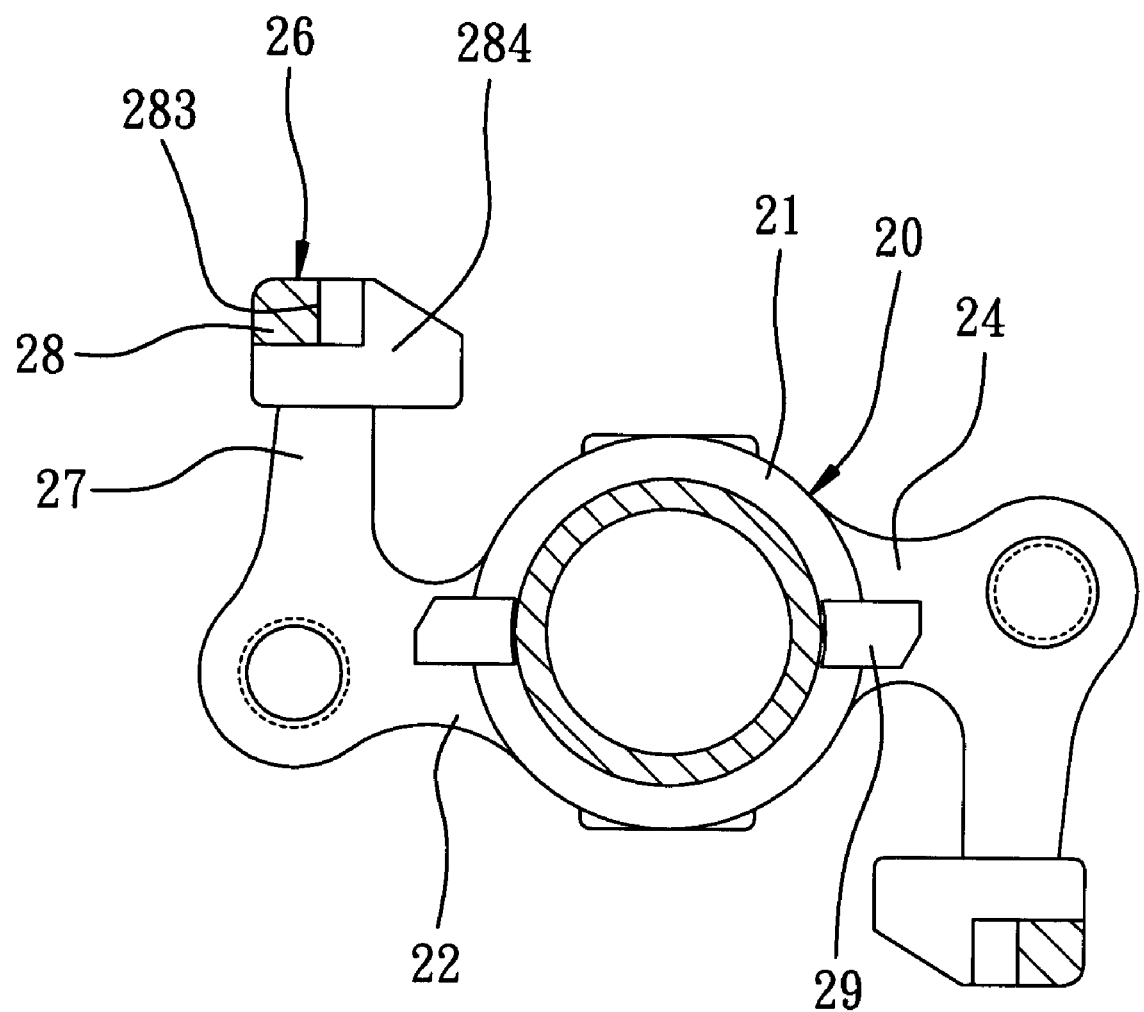
FIG. 9 is a fragmentary sectional view of the preferred embodiment taken along line 9—9 in FIG. 8.
Figure 10:
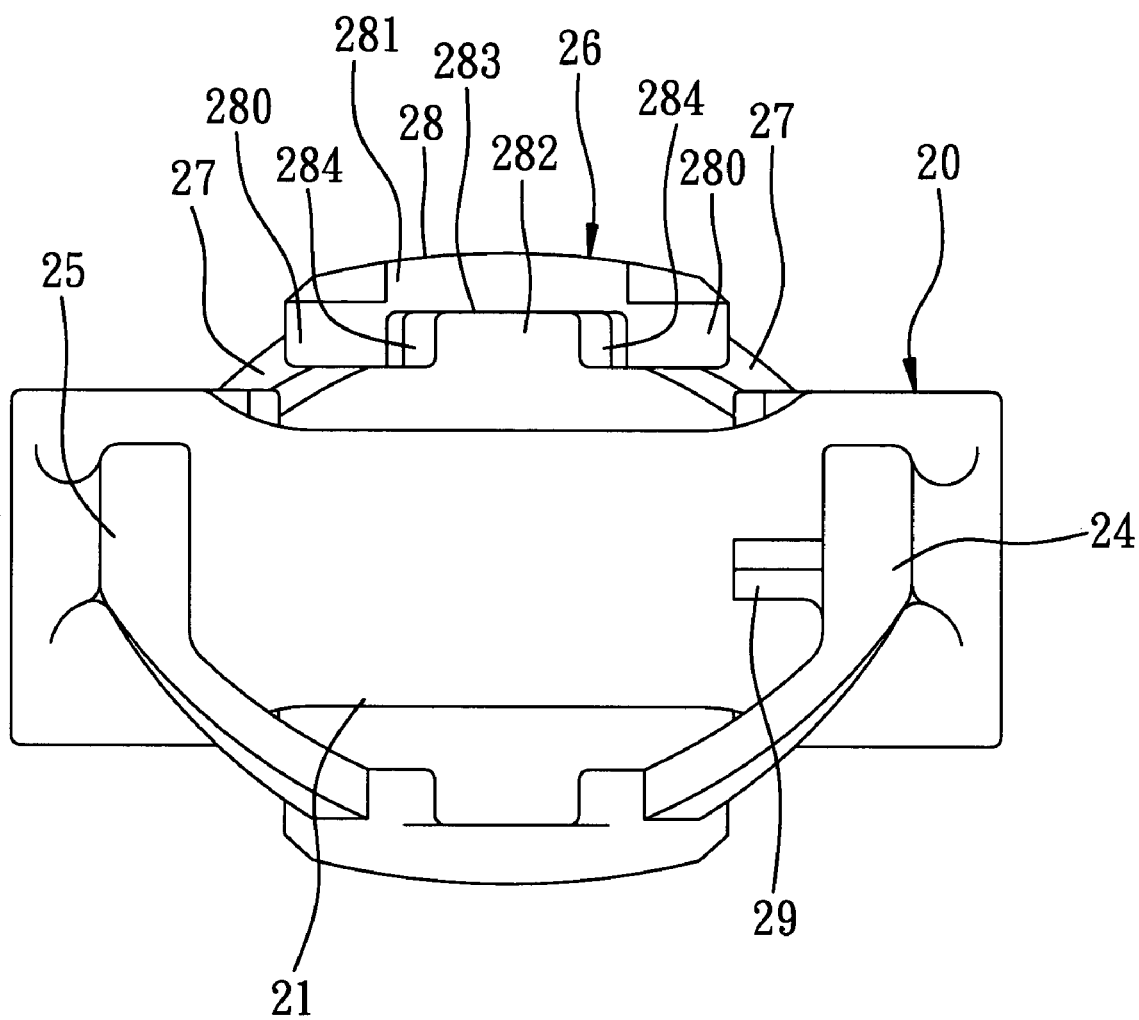
FIG. 10 is a front view of the pedal body of the preferred embodiment.

The cleat-retaining mechanism includes a front retaining unit 26, a rear retaining unit 30, a biasing member 40, an adjusting unit 50, and an indicating unit 60. The front retaining unit 26 includes two curved arms 27 that extend respectively, integrally, upwardly, and inwardly from the front pivot arms 22, 23, and a generally inverted U-shaped front cleat-retaining member 28 that is formed integrally between the curved arms 27. The front cleat-retaining member 28 is disposed in front of the shaft tube 21. Referring to FIGS. 8, 9, and 10, the front cleat-retaining member 28 has two thick side portions 280 (see FIG. 8) and a thin middle portion 281 that is formed integrally between the thick side portions 280 and that has a width smaller than that of the thick side portions 280 along a vertical direction so as to define a limiting groove 282 that is located between the thick side portions 280 and that is formed under the thin middle portion 281. The thin middle portion 281 is formed with an arcuate concave limiting surface 283. Each of the thick side portions 280 is formed with an inclined limiting surface 284 that extends rearwardly and outwardly. The front cleat-retaining member 28 further has two arcuate convex connecting surfaces 285, each of which has two ends that are connected respectively to a respective end of the arcuate concave limiting surface 283 and a front end of the corresponding inclined limiting surface 284.

Referring to FIGS. 5, 6, 7, 8, 12, 13, and 14, the rear retaining unit 30 includes a rear cleat-retaining member 31 that is disposed between and that is connected rotatably to the rear pivot arms 24, 25 by a horizontal pivot 39. A cleat-retaining space (R) (see FIG. 6) is defined among the front and rear cleat-retaining members 28, 31 and the horizontal cleat-supporting plates 211. The rear cleat-retaining member 31 is unitary, and has a top wall 32, an upright inner side wall 33 extending integrally and downwardly from an inner side of the top wall 32, an upright outer side wall 34 extending integrally and downwardly from an outer side of the top wall 32, an inner pivot hole 35 formed through the inner side wall 33, a frontwardly extending projection 351 formed on the inner side wall 33, an outer pivot hole 36 formed through the outer side wall 34, a bottom wall 37 extending inwardly from a bottom end of the outer side wall 34, and a clamping portion 38 extending frontwardly from a middle portion of the top wall 32 and having an arcuate concave limiting surface 381 and two rearwardly and upwardly inclined guiding surfaces 382 that are located at two opposite sides of the limiting surface 381.

Referring one again to FIGS. 2 and 3, the cleat 70 is unitary, is confined within the cleat-retaining space (R) (see FIG. 6), and has a front end engaging portion 71 that engages the front cleat-retaining member 28 and that is retained between the front cleat-retaining member 28 and the horizontal cleat-supporting plates 211, and a rear end engaging portion 72 that engages the rear cleat-retaining member 31 and that is retained between the rear cleat-retaining member 31 and the horizontal cleat-supporting plates 211. The front end engaging portion 71 has a wide lower portion 711 that is inserted into the limiting groove 282 in the front cleat-retaining member 28 at a front end thereof and that has a top surface disposed above lower ends of the inclined limiting surfaces 284 (see FIG. 5) of the front cleat-retaining member 28 so as to confine the wide lower portion 711 between the inclined limiting surfaces 284 (see FIG. 5), and a narrow upper portion 712 formed on an intermediate portion of the wide lower portion 711 that abuts against the arcuate concave limiting surface 283 of the front cleat-retaining member 28 at a front end thereof. The rear end engaging portion 72 of the cleat 70 also has a wide lower portion 721 and a narrow upper portion 722 formed on a middle portion of the wide lower portion 721. The wide lower portion 721 is formed with an inclined rear end surface 723 that is inclined rearwardly and upwardly.

Figure 3:
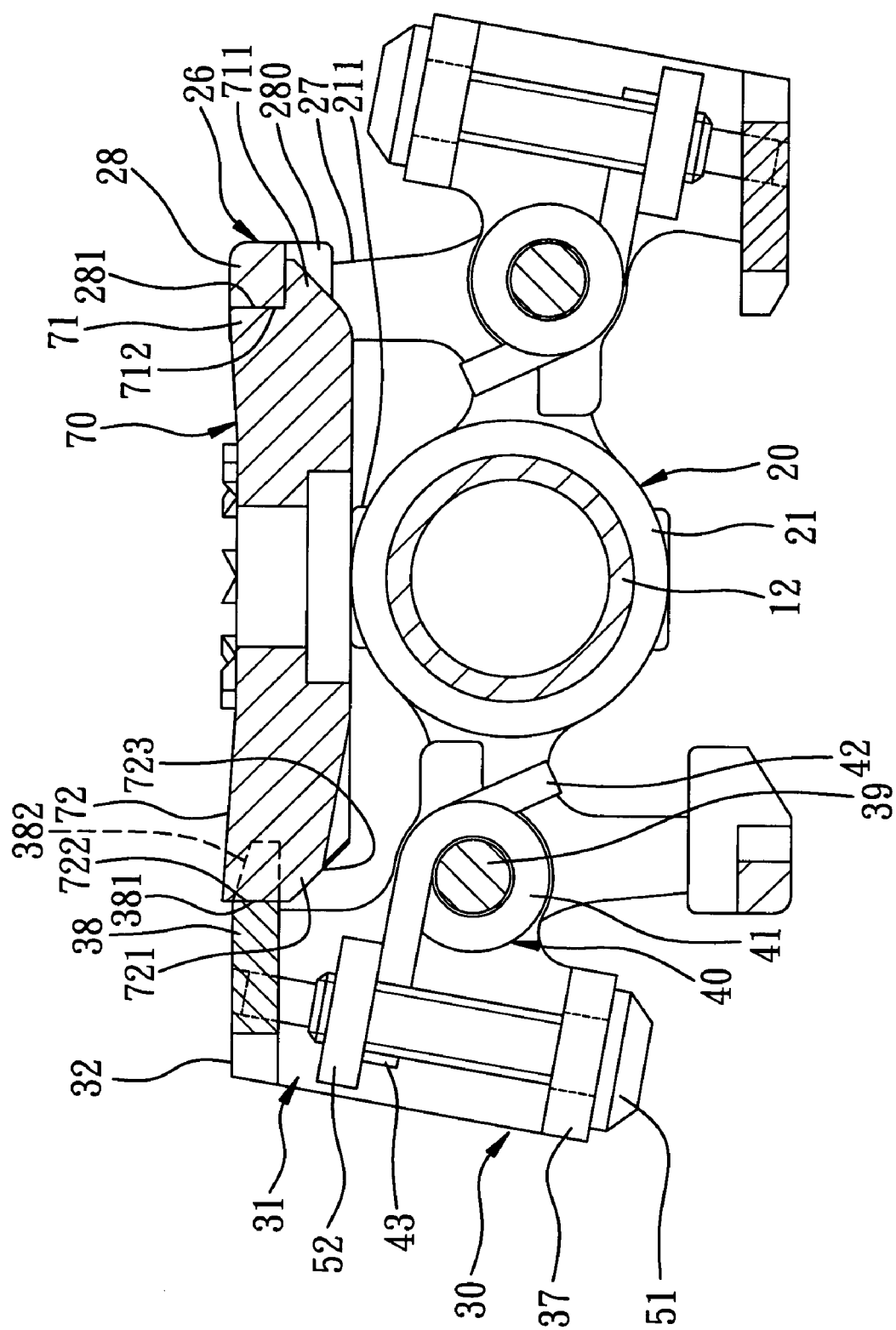
FIG. 3 is a cross-sectional view of the preferred embodiment.
Figure 4:
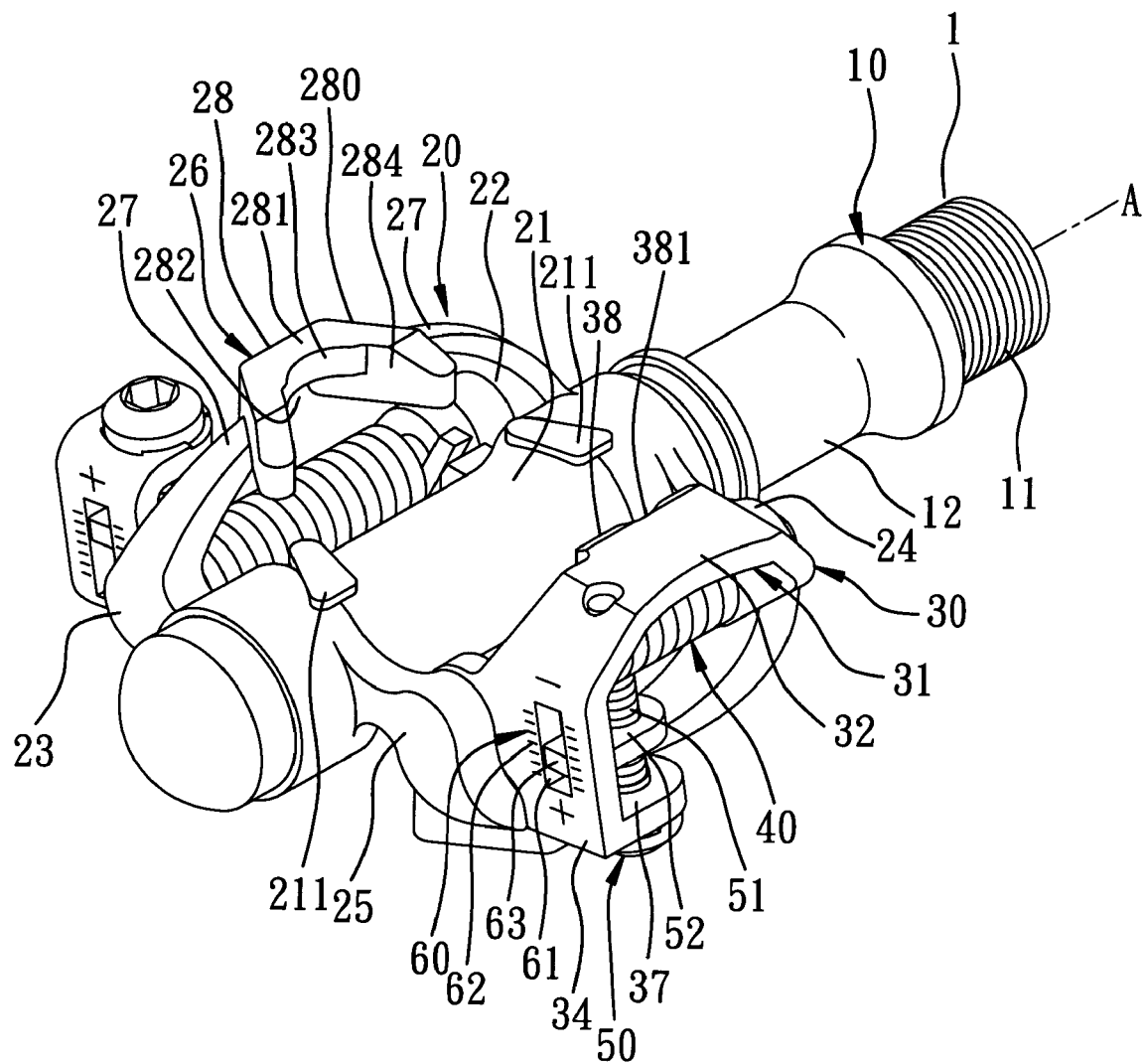
FIG. 4 is a fragmentary assembled perspective view of the preferred embodiment, in which a cleat is removed for the sake of brevity.

Referring to FIGS. 3, 4, and 5, the biasing member 40 is configured as a coiled torsional spring, and has a coiled body 41 disposed around the pivot 39, an inner end 42 pressing against a bottom surface of a stop element 29 that is formed integrally with the shaft tube 21, and an outer end 43 biasing the rear cleat-retaining member 31 to turn frontwardly to a position, where the projection 351 of the rear cleat-retaining member 31 presses against the stop element 29 and where the clamping portion 38 of the rear cleat-retaining member 31 presses against the top surface of the wide lower portion 721 of the rear end engaging portion 72 of the cleat 70 so as to clamp and fix the cleat 70 between the rear cleat-retaining member 31 and the pedal body 20. The narrow upper portion 722 of the rear end engaging portion 72 of the cleat 70 has a rear end that is confined within a gap 383 (see FIG. 12), which is defined by the arcuate concave limiting surface 381 of the rear cleat-retaining member 31.

Figure 15:
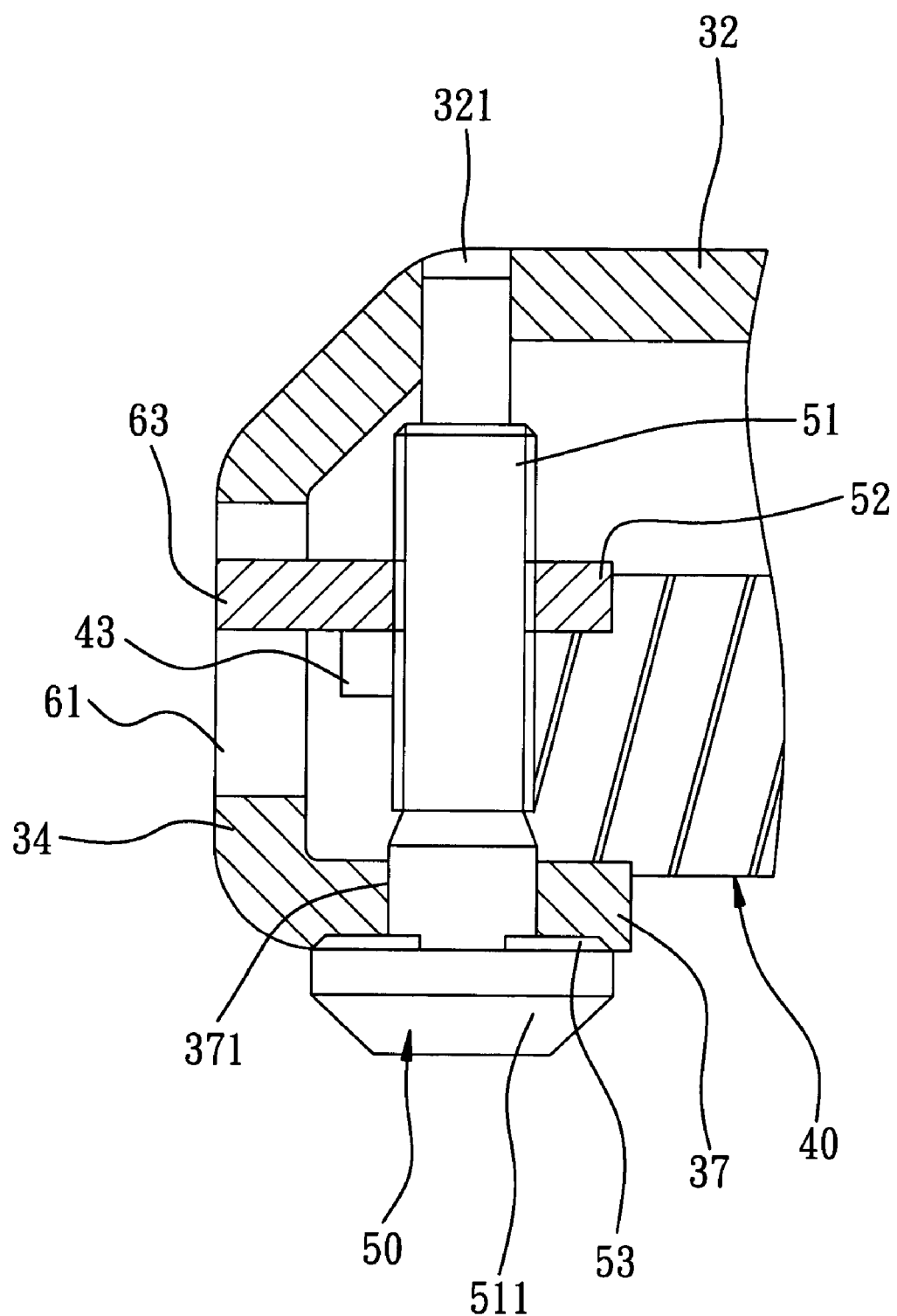
FIG. 15 is a fragmentary sectional view of an adjusting unit and an indicating unit of the preferred embodiment.

The adjusting unit 50 includes an adjustment bolt 51 extending through a hole 371 (see FIG. 5) in the bottom wall 37 of the rear cleat-retaining member 31 and into a hole 321 in the top wall 32 of the rear cleat-retaining member 31, and an adjustment nut 52 engaging the adjustment bolt 51 and located between the bottom wall 37 and the top wall 32. The outer end 43 of the biasing member 40 is disposed between the adjustment nut 52 and the bottom wall 37 of the rear cleat-retaining member 31, and presses against the adjustment nut 52, as shown in FIG. 15. The adjustment bolt 51 has a head 511 that is formed with a plurality of angularly equidistant projections 53, as shown in FIG. 5. The bottom wall 37 of the rear cleat-retaining member 31 is formed with a plurality of radially extending grooves (not shown) that engage respectively the projections 53 of the adjustment bolt 51 so as to permit indexing rotation of the adjustment bolt 51 when the biasing force of the biasing member 41 is adjusted.

The indicating unit 60 includes a slide slot 61 formed through the outer side wall 34 of the rear cleat-retaining member 31, a scale 62 disposed on the outer side wall 34 near the slide slot 61, and an indicating element 63 formed integrally with the adjustment nut 52 and received slidably in the slide slot 61 so as to prevent rotation of the adjustment nut 52 relative to the rear cleat-retaining member 31 and so as to permit movement of the adjustment nut 52 relative to the rear cleat-retaining member 31 during adjustment of the adjustment bolt 51.

During assembly, the cleat 70 is secured to the cyclist's shoe 80. The wide lower portion 711 of the front end engaging portion 71 of the cleat 70 is inserted into the groove 282 in the front cleat-retaining member 28. The rear end engaging portion 72 of the cleat 70 is placed over the rear cleat-retaining member 31. A downward force is applied to the rear end engaging portion 72 of the cleat 70 such that the inclined rear end surface 723 of the rear end engaging portion 72 slides along the inclined guiding surfaces 382 of the clamping portion 38 of the rear cleat-retaining member 31. As such, the rear cleat-retaining member 31 can be turned rearwardly so as to permit the cleat 70 to be clamped between the rear cleat-retaining member 31 and the pedal body 20.

When it is desired to remove the shoe 80 from the front and rear cleat-retaining members 28, 31, the cleat 70 is swung forcibly in a horizontal plane to move the narrow upper portion 712 of the front end engaging portion 71 of the cleat 70 over the arcuate concave limiting surface 283 and one of the arcuate convex connecting surfaces 285 of the front cleat-retaining member 28 so as to turn the rear cleat-retaining member 31 rearwardly, thereby permitting removal of the cleat 70 from the front cleat-retaining member 28. Because the connecting surfaces 285 are arcuate, the front end engaging portion 71 of the cleat 70 can be removed smoothly from the front cleat-retaining member 28. Then, the cleat 70 is removed from the shoe 80.

With this invention thus explained, it is apparent that numerous modifications and variations can be made without departing the scope and spirit of this invention. It is therefore intended that this invention be limited only as indicated by the appended claims.

I claim:

1. A bicycle pedal assembly comprising:
   a pedal shaft;
   a unitary pedal body including
      a shaft tube sleeved rotatably on said pedal shaft,
      a generally inverted U-shaped front cleat-retaining member disposed in front of said shaft tube and having two thick side portions and a thin middle portion that is formed between said thick side portions and that has a width smaller than that of said thick side portions along a vertical direction so as to define a limiting groove among said thin middle portion and said thick side portions, said thin middle portion being formed with an arcuate concave limiting surface that has two ends, each of said thick side portions being formed with an inclined limiting surface that extends rearwardly and outwardly and that has a front end, said front cleat-retaining member further having two arcuate convex connecting surfaces, each of which has two ends that are connected respectively to a respective one of said ends of said arcuate concave limiting surface and said front end of a respective one of said inclined limiting surfaces, and
      two aligned pivot arms extending rearwardly from said shaft tube;
   a rear retaining unit disposed between said pivot arms and including a rear cleat-retaining member mounted pivotally on said pivot arms so as to define a cleat-retaining space among said front and rear cleat-retaining members and said shaft tube;
   a unitary cleat confined within said cleat-retaining space and having a front end engaging portion that engages said front cleat-retaining member and that is retained between said front cleat-retaining member and said shaft tube, and a rear end engaging portion that engages said rear cleat-retaining member and that is retained between said rear cleat-retaining member and said shaft tube, said front end engaging portion having a wide lower portion that is inserted into said limiting groove in said front cleat-retaining member at a front end thereof and that has a top surface disposed above lower ends of said inclined limiting surfaces of said front cleat-retaining member so as to confine said wide lower portion of said cleat between said inclined limiting surfaces, and a narrow upper portion formed on an intermediate portion of said wide lower portion and that abuts against said arcuate concave limiting surface of said front cleat-retaining member at a front end thereof; and
   a biasing member for biasing said rear cleat-retaining member to turn frontwardly so as to clamp and fix said cleat between said rear cleat-retaining member and said pedal body, said cleat being swingable forcibly in a horizontal plane to move said narrow upper portion of said cleat over said arcuate concave limiting surface and one of said arcuate convex connecting surfaces so as to permit removal of said cleat from said front cleat-retaining member.

2. The bicycle pedal assembly as claimed in claim 1, wherein said shaft tube is formed integrally with two horizontal cleat-supporting plates that are disposed proximate to said pivot arms, respectively, and that support said cleat thereon.

3. The bicycle pedal assembly as claimed in claim 1, wherein said rear cleat-retaining member includes:
   a top wall having an inner side and an outer side:
   an upright inner side wall with a frontwardly extending projection and an inner pivot hole;
   an upright outer side wall with an outer pivot hole;
   a bottom wall extending inwardly from a bottom end of said outer side wall;
   a clamping portion extending frontwardly from a middle portion of said top wall and having an arcuate concave limiting surface and two rearwardly and upwardly inclined guiding surfaces that are located at two opposite sides of said limiting surface; and
   a horizontal pivot extending through said inner pivot hole in said inner side wall, said outer pivot hole in said outer side wall, and said pivot arms;
   said bicycle pedal assembly further including an adjusting unit that includes:
   an adjustment bolt extending through said bottom wall of said rear cleat-retaining member; and
   an adjustment nut engaging said adjustment bolt and located between said bottom wall and said top wall;
   said biasing member being configured as a coiled torsional spring that has an inner end pressing against said shaft tube, and an outer end disposed between said adjustment nut and said bottom wall of said rear cleat-retaining member and pressing against said adjustment nut.

4. The bicycle pedal assembly as claimed in claim 3, wherein said outer side wall of said rear cleat-retaining member is formed with a slide slot therethrough, said bicycle pedal assembly further including:
   a scale disposed on said outer side wall near said slide slot; and
   an indicating element formed integrally with said adjustment nut and received slidably in said slide slot so as to prevent rotation of said adjustment nut relative to said rear cleat-retaining member and so as to permit movement of said adjustment nut relative to said rear cleat-retaining member during adjustment of said adjustment bolt.

* * * * *